US012700631B2

(12) United States Patent
Kawakita

(10) Patent No.: US 12,700,631 B2
(45) Date of Patent: Aug. 4, 2026

(54) BATTERY PACKAGING MATERIAL INCLUDING SUBSTRATE PROTECTIVE LAYER

(71) Applicant: Resonac Packaging Corporation, Hikone (JP)

(72) Inventor: Keitaro Kawakita, Hikone (JP)

(73) Assignee: Resonac Packaging Corporation, Hikone (JP)

( * ) Notice: Subject to any disclaimer, the term of this patent is extended or adjusted under 35 U.S.C. 154(b) by 667 days.

(21) Appl. No.: 18/116,315

(22) Filed: Mar. 2, 2023

(65) Prior Publication Data

US 2023/0282912 A1    Sep. 7, 2023

(30) Foreign Application Priority Data

Mar. 2, 2022    (JP) ................................. 2022-031498
Jan. 31, 2023    (JP) ................................. 2023-013088

(51) Int. Cl.
H01M 50/122        (2021.01)
H01M 50/14         (2021.01)
(52) U.S. Cl.
CPC ......... H01M 50/122 (2021.01); H01M 50/14 (2021.01)
(58) Field of Classification Search
CPC ........... H01M 50/124; H01M 50/1243; H01M 50/1245; H01M 50/126; H01M 50/128; H01M 50/129
See application file for complete search history.

(56) References Cited

U.S. PATENT DOCUMENTS

2012/0135301 A1 †  5/2012  Akita
2017/0149040 A1 *  5/2017  Suzuki ................ H01M 50/457
2018/0183017 A1 *  6/2018  Minamibori ............ B32B 27/34

FOREIGN PATENT DOCUMENTS

CN      110459702      11/2019
EP      3413371      12/2018
JP      2006-206805      8/2006
JP      6077394 B2      11/2013
JP      2020-155364      9/2020
JP      7226922 B2 †   2/2023
KR      20200053782 A  *  5/2020   ............. G01R 31/50

OTHER PUBLICATIONS

Communication Pursuant to Rule 114(2) EPC for corresponding EP Application No. 23159654.5-1103, Jul. 31, 2024.
Extended European Search Report for corresponding EP Application No. 23159654.5-1108, Aug. 7, 2023.

* cited by examiner
† cited by third party

*Primary Examiner* — Imran Akram
(74) *Attorney, Agent, or Firm* — MORI & WARD, LLP

(57)                ABSTRACT
The battery packaging material includes a substrate layer, a heat-fusible resin layer, a barrier layer arranged between the substrate layer and the heat-fusible resin layer, and a substrate protective layer as an outermost layer arranged on an outer side of the substrate layer. The substrate protective layer includes a binder resin, wax as solid fine particles, resin beads, and inorganic fine particles, and a gross value of the surface of the substrate protective layer is 1% and 5%.

16 Claims, 2 Drawing Sheets

BATTERY PACKAGING MATERIAL INCLUDING SUBSTRATE PROTECTIVE LAYER

BACKGROUND OF THE INVENTION

Technical Field

The present invention relates to a packaging material for a power storage device, such as, e.g., a battery or a capacitor used for a mobile device including, e.g., a smartphone and a tablet computer, or a battery or a condenser used to store electric power for an electric vehicle, wind power generation, solar power generation, and nighttime electricity.

Background Art

In a laminated battery, a case having a sharp and deep shape is required in order to improve the volume-energy density, and various moldability improvement measures have been studied. As one example, inorganic and/or organic solid fine particles are made to dispersedly include in a substrate protective layer serving as an outer surface of a battery packaging material, and the surface gross value of the substrate protective layer is set to 1 to 15%. With this configuration, slipperiness by the surface unevenness effect is imparted, and good moldability is ensured (see Patent Document 1).

Further, in a production process of a battery, when the surface of the packaging material, which is a case material, is damaged, the appearance of the product is impaired. In order to prevent the occurrence of the poor appearance during the production process, a method is employed in which a protective tape is adhered to the packaging material, and the protective tape is peeled off after completion of the production.

Although the protective tape is required to have adhesive properties that the protective tape is not peeled off during the production process, in a case where the protective tape firmly adheres, the adhesive of the protective tape may remain on the packaging material after the peeling. Further, in a packaging material in which a colored layer containing a carbon black is laminated on a surface of the packaging material, the colored layer may also be peeled off together with the protective tape.

With respect to the problem of such a protective tape, the adhesive residues after the peeling of the protective layer have been conventionally addressed by the adhesive force of the protective tape (see Patent Document 2). Further, a technique for strengthening a colored layer has been proposed to cope with the peeling of the colored layer (see Patent Document 3).

PRIOR ART DOCUMENT

Patent Document

Patent Document 1: Japanese Patent No. 6077394
Patent Document 2: Japanese Unexamined Patent Application Publication No. 2020-155364
Patent Document 3: Japanese Unexamined Patent Application Publication No. 2006-206805

SUMMARY OF THE INVENTION

Problems to be Solved by the Invention

However, the technique disclosed in Patent Document 2 is not a measure to prevent adhesive residues on the packaging material. Further, the technique disclosed in Patent Document 3 does not solve the problem of adhesive residues for the packaging material in which the outermost layer is not a colored layer containing a carbon black.

Means for Solving the Problems

In view of the background art described above, an object of the present invention is to provide a battery packaging material provided with a substrate protective layer for improving moldability, wherein the battery packaging material is capable of imparting contradictory properties that a protective tape adhered to a surface of a substrate protective layer is not unintentionally peeled off and the protective tape can be peeled off without leaving the adhesive residues of the protective tape, and preventing the deterioration of the appearance due to the adhesive residues of the protective tape.

That is, the present invention has the configuration recited in the following items [1] to [10].

[1] A battery packaging material comprising:
a substrate layer;
a heat-fusible resin layer;
a barrier layer arranged between the substrate layer and the heat-fusible resin layer; and
a substrate protective layer as an outermost layer arranged on an outer side of the substrate layer,
wherein the substrate protective layer includes a binder resin and solid fine particles which are wax, resin beads and inorganic fine particles, and
wherein a gross value of a surface of the substrate protective layer is 1% to 5%.

[2] The battery packaging material as recited in the above-described Item [1],
wherein an average particle diameter of the wax is 5 μm to 20 μm, an average particle diameter of the resin beads is 1 μm to 10 μm, and an average particle diameter of the inorganic fine particles is 1 μm to 10 μm, and
wherein a total content rate of the wax, the resin beads, and the inorganic fine particles in the substrate protective layer is 30 mass % to 50 mass %.

[3] The battery packaging material as recited in the above-described Items [1] or [2],
wherein the wax is at least one type of wax selected from the group consisting of polyethylene wax, polypropylene wax, and polytetrafluoroethylene wax.

[4] The battery packaging material as recited any one of the above-described Items [1] to [3],
wherein the resin beads are at least one type of resin beads selected from the group consisting of acrylic resin beads, urethane resin beads, polyethylene resin beads, polystyrene resin beads, silicone resin beads, and fluorocarbon resin beads.

[5] The battery packaging material as recited any one of the above-described Items [1] to [4],
wherein the inorganic fine particles are at least one type of inorganic fine particles selected from the group consisting of silica, alumina, kaolin, calcium oxide, calcium carbonate, calcium sulfate, barium sulfate, and calcium silicate.

[6] The battery packaging material as recited any one of the above-described Items [1] to [5],
wherein the binder resin is at least one type of a resin selected from the group consisting of an acryl-based resin, a urethane-based resin, a polyolefin-based resin, a phenoxy-based resin, a polyester-based resin, and a tetrafluoroolefin-based resin.

[7] The battery packaging material as recited in any one of the above-described Items [1] to [6], wherein at least one of the substrate protective layer and the substrate layer contains a coloring agent.

[8] The battery packaging material as recited any one of the above-described Items [1] to [6], wherein the barrier layer and the substrate layer are laminated via an adhesive layer, and at least one of the substrate protective layer, the substrate layer, and the adhesive layer includes a coloring agent.

[9] The battery packaging material as recited any one of the above-described Items [1] to [6], wherein a colored layer is provided at least one of between the substrate protective layer and the substrate layer and between the substrate layer and the barrier layer.

[10] The battery packaging material as recited in any one of the above-described Items [1] to [6], wherein the barrier layer and the substrate layer are laminated via an adhesive layer, and wherein a colored layer is provided at least one of between the substrate protective layer and the substrate layer, between the substrate layer and the adhesive layer, and between the adhesive layer and the barrier layer.

Effects of the Invention

In the battery packaging material as recited in the above-described Item [1], the substrate protective layer contains three types of mutually different solid fine particles, whereby unevenness is formed on the surface, and the gross value of the surface is set to 1% to 5%. Due to the gross value set as described above, good slipperiness is obtained during molding. When a protective tape is adhered, a portion large in the adhesive amount and a portion small in the adhesive amount are mixed finely. As a result, it is possible to easily peel off the protective tape after use while keeping adhesive strength when required, which can suppress the occurrence of adhesive residues after peeling the protective tape.

According to the battery packaging material as recited in the above-described Item [2], the average particle diameter of each of the wax, the resin beads, and the inorganic fine particles, and the total content rate of three types of solid fine particles are defined. With this, a desired gross value is obtained, good slipperiness is obtained at the time of molding, and adhesive residues after the peeling of the protective tape is suppressed.

According to the battery packaging material as recited in the above-described Item [3], a gross value defined by the selected wax is obtained, good slipperiness is obtained at the time of molding, and adhesive residues after the peeling of the protective tape is suppressed.

According to the battery packaging material as recited in the above-described Item [4], the gross value defined by the selected resin beads is obtained, good slipperiness is obtained at the time of molding, and adhesive residues after the peeling of the protective tape is suppressed.

According to the battery packaging material as recited in the above-described Item [5], the gross value defined by the selected inorganic fine particles is obtained, good slipperiness is obtained at the time of molding, and adhesive residues after the peeling of the protective tape is suppressed.

According to the battery packaging material as recited in the above-described Item [6], since the adhesive suitability of the selected binder resin and the adhesive of the protective tape are good, the adhesive strength can be differentiated between the protrusions and portions other than the protrusions.

The battery packaging material as recited in the above-described Items [7], [8], [9], and [10] is colored by a coloring agent, so that the visibility of the adhesive residue portion of the protective tape is improved, and the adhesive residue determination can be easily performed. Further, the design properties can also be imparted.

EMBODIMENTS FOR CARRYING OUT THE INVENTION

Some preferred embodiments of the present invention are shown by way of example, and not limitation, in the accompanying figures.

Figure 1:
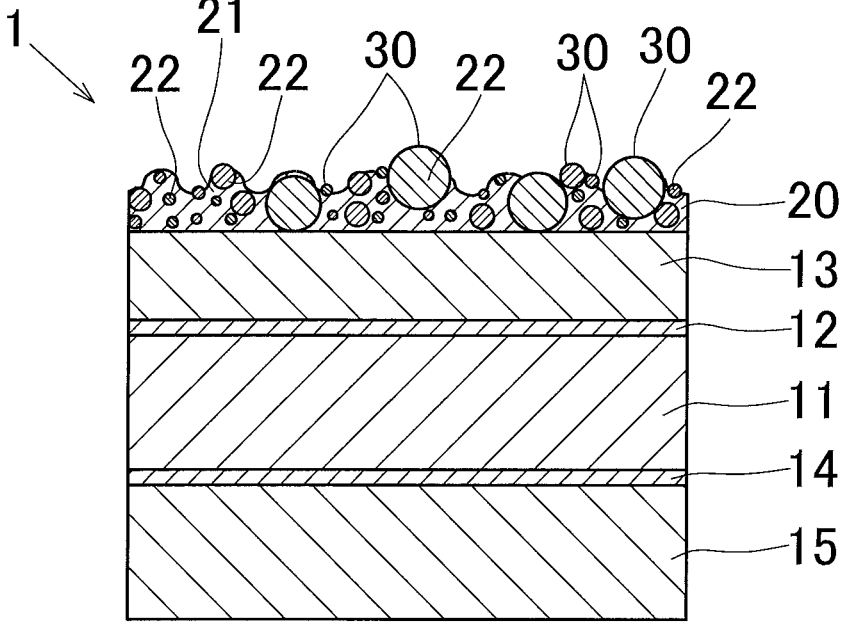
FIG. 1 is a cross-sectional view showing one example of a battery packaging material according to the present invention.

FIG. 1 shows one embodiment of a battery packaging material according to the present invention.

In the following description, a layer assigned by the same reference symbol represents the same or equivalent layer, and therefore, the duplicate description thereof will be omitted.

In the battery packaging material 1 shown in FIG. 1, a substrate layer 13 is bonded to one surface of a barrier layer 11 via a first adhesive layer 12, a heat-fusible resin layer 15 is bonded to the other surface via a second adhesive layer 14, and a substrate protective layer 20 is laminated on the substrate layer 13.

A battery case is produced by arranging the battery packaging materials 1 with the heat-fusible resin layers 15 faced to each other and heat-sealing the peripheries of the battery packaging materials 1, and a bare cell is encapsulated in the battery case. In the battery case, the substrate protective layer 20 is arranged on the outer side, and the heat-fusible resin layer 15 is arranged on the inner side. In this specification, when describing the position of each layer constituting the battery packaging material 1 with directions, the direction toward the substrate protective layer 20 is referred to as the outer side, and the direction toward the heat-fusible resin layer 15 is referred to as the inner side in accordance with the directions of the inner and outer sides of the case.

The adhered protective tape needs to be firmly adhered to the outer surface of the battery packaging material 1 without unintentionally peeling, in addition to having excellent moldability. However, the outer surface of the battery packaging material 1 is required to have such conflicting characteristics that when the protective tape becomes no longer required, the protective tape can be cleanly peeled off without remaining the adhesive residues of the protective tape and without causing damage to the adhered surface.

[Substrate Protective Layer]

The substrate protective layer 20 is a layer that imparts excellent slipperiness to the surface of the battery packaging material 1 to improve moldability and also impart excellent chemical resistance, solvent resistance, and abrasion resistance.

The substrate protective layer 20 is a cured film made of a resin composition including a binder resin 21 and a plurality of solid fine particles 22 which will be described later. Some of the solid fine particles 22 in the cured film are buried in the binder resin 21, but some of them protrude outward from the surface of the binder resin 21 to form protrusions 30.

Therefore, on the surface of the substrate protective layer 20, not only ultrafine unevenness by the binder resin 21 but also large unevenness by the protrusions 30 are formed. That is, the surface of the substrate protective layer 20 includes a portion where the binder resin 21 is present and a portion where the solid fine particles 22 are present (protrusion 30), and unevenness is formed on the surface.

The unevenness of the surface of the substrate protective layer 20 affects the surface glossiness. As the unevenness becomes smaller and the surface becomes smoother, the gloss increases, and as the unevenness becomes larger, the surface becomes rougher, and the gloss decreases. The unevenness of the surface of the substrate protective layer 20 affects both the slipperiness at the time of molding and the easy peeling property of the protective tape.

In the present invention, as the material of the substrate protective layer 20, a plurality of types of solid fine particles 22 having different properties are, used, and the unevenness of the surface of the substrate protective layer 20 is defined by a gross value to obtain good moldability and easy peeling property of the protective tape.

Hereinafter, the easy peeling property of the protective tape of the substrate protective layer 20, the resin composition constituting the substrate protective layer 20, and the gross value of the surface of the substrate protective layer 20 will be described in detail.

(Easy Peeling Property of Protective Tape)

Since the protrusions 30 protrude high on the surface of the substrate protective layer 20, the adhesive of the protective tape is brought into contact with the top portions of the protrusions 30 but is hardly brought into contact with the inclined portions around them. On the other hand, since the portions other than the protrusions 30 are smoother than the protrusions 30, the adhesive is easily brought into contact thereto. The portion where the adhesive is hard to be brought into contact is less in the contact amount of the adhesive, and therefore, the strength becomes weaker, the portion where the adhesive is easily brought into contact is large in the contact amount of the adhesive, and therefore, the adhesive strength becomes stronger.

As described above, since a state is generated in which the portion in which the contact amount of the adhesive is large and the portion in which the contact amount of the adhesive is small are finely mixed on the surface of the substrate protective layer 20, it is possible to easily peel off the protective film after use while keeping adhesive strength when needed, and adhesive residues are less likely to occur after peeling.

(Resin Composition Configuring Substrate Protective Layer)

The resin composition constituting the substrate protective layer 20 includes a binder resin 21 and solid particles 22 of three types of composition, which are wax, resin beads and inorganic fine particles.

As the binder resin 21, at least one resin selected from the group consisting of an acryl-based resin, an urethane-based resin, a polyolefin-based resin, a phenoxy-based resin, a polyester-based resin, and a tetrafluoroolefin-based resin is preferably used.

Since these resins are excellent in the wettability of the coating film surface after coating, and the adhesion suitability of the adhesive of the protective tape is good, the adhesive strength can be differentiated between the protrusions 30 and portions other than the protrusions 30. Further, these resins have higher chemical resistance and solvent resistance, and therefore, the solid fine particles are less likely to fall off due to resin degradation or the like.

In a case where an electrolyte is likely to adhere in a production line of a battery, a tetrafluoroolefin-based resin with good electrolyte resistance can be recommended. As other particularly preferred resins, a urethane-based resin, a polyester urethane-based resin, and a urethane phenoxy-based resin can be exemplified.

Further, the binder resin may be composed of a main agent resin containing at least one type of the above-described resin and a curing agent for curing the main agent resin.

As the main agent resin, an acrylic polyol resin, a urethane polyol resin, a polyolefin polyol resin, a polyester polyol resin, a phenoxy-based resin, a copolymer of tetrafluoroolefins and carboxylic acid vinyl ester, and a copolymer of tetrafluoroolefins and alkyl vinyl ether can be exemplified.

The curing agent is not particularly limited and may be appropriately selected according to the main agent resin. As the curing agent, an isocyanate compound, such as, e.g., hexamethylene diisocyanate (HDI), isophorone diisocyanate (IPDI), tolylene diisocyanate (TDI), diphenylmethane diisocyanate (MDI), xylylene diisocyanate (XDI), or a modified product of these isocyanate compounds, can be exemplified.

The curing agent is preferably contained by 5 parts by mass to 30 parts by mass to the ratio of 100 parts by mass of the main agent. When it is less than 5 parts by mass, the adhesive property and the solvent resistance to the substrate layer 13 may be reduced. When it exceeds 30 parts by mass, the substrate protective layer 20 may become hard, which may deteriorate moldability.

As the solid fine particles 22, three types of fine particles, i.e., wax, resin beads, and inorganic fine particles, are used. They are different in hardness to each other, and differ in hardness from the cured binder resin 21. The protrusions 30 by the solid fine particles 22 are formed on the surface of the substrate protective layer 20, and therefore, portions different in hardness, i.e., the binder resin 21 and three types of solid fine particles, exist on the surface of the substrate protective layer 20.

The easy of separation of the adhesive of the protective tape varies depending on the hardness of the application surface. When the protective tape is peeled off from the above-described surface of the substrate protective layer 20, the timing at which the adhesive peels off at different hardness shifts, which disperses the force applied to the adhesive. Therefore, cohesive fracture of the adhesive is less likely to occur, and therefore, glue residues are less likely to occur.

The average particle diameter of the wax is preferably 5 μm to 20 μm, the average particle diameter of the resin beads is preferably 1 μm to 10 μm, and the average particle diameter of the inorganic fine particles is preferably 1 μm to 10 μm. The particularly preferred average particle diameter is 10 μm to 18 μm in the case of the wax, 2 μm to 8 μm in the case of the resin beads, and 1 μm to 5 μm in the case of the inorganic particles.

In the three types of solid fine particles, it is preferably that the particle size of the wax be made larger than that of the resin beads and the inorganic fine particles to form more protrusions 30 by the wax. The wax is weak in the adhesive strength than the resin beads and the inorganic fine particles. Therefore, by increasing the protrusions 30 by the wax, it becomes easy to form the portion strong in the adhesive strength and the portion weak in the adhesive strength. Consequently, the adhesive residue suppressing effect increases.

Specifically, it is preferable that the average particle diameter of the wax be 2 times to 3.5 times of the average particle diameter of the resin beads, and that the average particle diameter of the inorganic fine particles be smaller than the average particle diameter of the resin beads.

Further, in the substrate protective layer 20, the total content rate of the three types of solid fine particles is preferably 30 mass % to 50 mass %, which can balance between the adhesive strength of the protective tape when required and the easy peeling property after use. The particularly preferred content rate is 35 mass % to 50 mass %.

Further, although each content rate of the three types of solid fine particles is not limited, the preferred content rates are as follows.

The content rate of the wax is preferably 1 mass % to 10 mass %. When the content rate of the wax is 1 mass % to 10 mass %, the contact point between the protrusions by the wax and the protective tape can be ensured, and the contact between the binder resin and the protective tape can be appropriately suppressed, which makes it easy to balance the adhesive properties and the adhesive residues. Note that when the content rate of the wax exceeds 10 mass %, the wax becomes likely to fall off. The content rate of the wax is preferably 3 mass % to 8 mass %, which enables to more effectively exert the above-described effects.

The content rate of the resin beads is preferably 1 mass % to 20 mass %. When the content rate of the resin beads is 1 mass % to 20 mass %, fine unevenness can be formed on the binder resin surface, which enables to adjust the contact area to the protective tape and finely adjust the adhesive properties to the protective tape and the adhesive residues. When the content rate of the resin beads exceeds 20 mass %, the adhesive properties to the protective tape is inhibited.

The content rate of the resin beads is preferably 4 mass % to 12 mass %, which can further exhibit the above-described effects.

The content rate of the inorganic fine particles is preferably 20 mass % to 40 mass %. When the content rate of the inorganic fine particles is 20 mass % to 40 mass %, it is easy to adjust the gross rate value to a predetermined gross value (1 to 5%) after adding the wax and the resin beads to the binder resin. When the content rate of the inorganic fine particles exceeds 40 mass %, the coating film becomes brittle, and when it is less than 20 mass %, the predetermined gross value cannot be obtained. The content rate of the inorganic fine particles is preferably 25 mass % to 35 mass %, which can further exert the above-described advantages.

Note that the content rate of the solid fine particles rate is a ratio of the solid fine particles to the total of the binder resin and the solid fine particles, not including the solvent used to adjust the viscosity at the time of coating.

The solid fine particles are required to contain at least one type of the wax, the resin beads, and the inorganic fine particles, and may contain two or more types from one category. Further, the fine particles belonging to each category can be exemplified as follows.

As the wax, polyethylene wax, polypropylene wax, and polytetrafluoroethylene wax can be exemplified.

Particularly, as the wax, polytetrafluoroethylene wax or polyethylene wax can be preferably used.

Polytetrafluoroethylene wax (PTFE wax) has a relatively high melting point, and therefore, the protrusions on the surface of the substrate protective layer are not easily crushed (protrusions are easily maintained) during heat sealing, and the chemical resistance, such as, e.g., electrolyte resistance, is excellent.

Polyethylene wax (PE wax) has many choices because of its large number of types of average particle diameters and has features that it is easy to adjust fine protrusions by adjusting the additive amount.

As the resin beads, acrylic resin beads, urethane resin beads, polyethylene resin beads, polystyrene resin beads, silicone resin beads, and fluorocarbon resin beads can be exemplified.

Particularly, as the resin beads, acrylic resin beads, or polyethylene resin beads can be preferably used.

The acrylic resin beads (AC resin beads) have a higher melting point, and therefore it is easy to Maintain the fine protrusions of the surface of the substrate protective layer 20 during heat sealing.

Polyethylene resin beads (PE resin beads) have many choices because of its large number of types of average particle diameters and have features that it is possible to easily adjust fine protrusions by adjusting the additive amount.

As the inorganic fine particles, silica, alumina, kaolin, calcium oxide, calcium carbonate, calcium sulfate, barium sulfate, and calcium silicate can be exemplified.

Particularly, as the inorganic fine particles, silica, alumina, or barium sulfate can be preferably used.

Both silica and alumina are spherical, and there are many choices because of the large number of types of average particle diameters, and the gross value can be finely adjusted by adjusting the additive amount. Further, the abrasion resistance is also good, and the scratch resistance of a matte layer can be improved.

Barium sulfate is plate-shaped, has higher optical diffusion than silica and alumina, and is easy to adjust the gross value.

Inorganic fine particles are preferable because they can compensate for advantages and disadvantages when a plurality of types of inorganic fine particles having different properties are used in combination.

For example, when barium sulfate and silica or alumina are used in combination, it becomes easy to adjust the gross value to a predetermined gross value by roughly setting the gross value to a target gross value by the addition of barium sulfate and adjusting the additive amount of silica or alumina.

In the present invention, the wax is added to impart a slip effect to the coating film surface by mainly forming large unevenness on the coating film, and the resin beads are added to impart a light diffusion effect (matte effect) to the coating film surface by mainly forming fine unevenness on the coating film.

For example, the polyethylene wax is added as a roughening agent, is easily deformed, and functions as a lubricant, and the polyethylene resin beads are added as a matting agent. Further, it is preferable that the average particle diameter of the wax be larger than the average particle diameter of the resin beads, as described above, due to the difference in the effectiveness between the wax and the resin beads.

Further, a lubricant and/or a surfactant may be added to the substrate protective layer 20, in addition to the binder resin 21 and the solid fine particles 22. The lubricant and the surfactant are effective in lowering the adhesive force of the adhesive of the protective tape, and they are precipitated on the surface of the substrate protective layer 20, which improves the peeling property of the protective tape and causes the adhesive residues to be less likely to occur.

As the lubricant, the following various amidos can be exemplified.

As the saturated fatty acid amids, lauramide, palmitamide, stearamide, behenamide, and hydostearic acid amide can be exemplified.

As the unsaturated fatty acid amides, oleamide and erucamide can be exemplified.

As the substituted amides, N-oleylpalmitamide, N-stearyl stearamide, N-stearyl oleamide, N-oleyl stearamide, and N-stearyl erucamide can be exemplified.

As the methylolamides, methylol stearamide can be exemplified.

As saturated fatty acid bisamides, methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenebisbehenic acid amide, hexamethylenehydroxystearic acid amide, N,N'-distearyladipine acid amide, N,N'-distearylsebacic acid amide, can be exemplified.

As the unsaturated fatty acid bisamides, ethylenebisoleamide, ethylenebiserucic acid amide, hexamethylenebisbleamide, N,N'-dioleyladipic acid amide, and N,N'-dioleylsebacic acid amide can be exemplified.

As the fatty acid ester amides, stearamide ethyl stearate can be exemplified.

As the aromatic bisamides, m-xylylene bisstearamide, m-xylylene bishydroxystearic acid amide, and N,N'-cystearyl isophthalic acid amide can be exemplified.

As the surfactant, an anionic surfactant, a cationic surfactant, and a nonionic surfactant can, be exemplified.

(Gross Value of Surface of Substrate Protective Layer)

In the present invention, the surface gloss of the substrate protective layer 20 is evaluated by a gross value measured at an incident angle of 60° in accordance with JIS Z8741: 1997 "Specular Gloss-Measuring Methods," and the gross value is defined to 1% to 5%.

In the gross value, as the numerical value becomes smaller, the surface unevenness becomes larger, and the glossiness is reduced, and as the numerical value becomes greater, the surface unevenness becomes smaller and smoother, and the gloss increases. As described above, the adhesive of the protective tape is less likely to come into contact with the protrusions except for the protrusions 30. Therefore, the smaller the gross value, the larger the unevenness and the smaller the adhesive contact amount and the weaker the adhesive strength, but the smaller the adhesive residues at the time of peeling. Conversely, the larger the gross value, the smaller the unevenness and the higher the adhesive contacts and the stronger the adhesive strength, but the more glue residues during peeling.

If the gross value is less than 1%, the adhesive residues at the time of pealing the protective tape is small, but the adhesive strength (adhesive force) when required is insufficient. If the gross value is less than 1%, the unevenness becomes too large, which is not preferable from the viewpoint of appearance. On the other hand, if the content exceeds 5%, the adhesive strength is satisfactory, but there is a possibility that the adhesive residues may be generated at the time of peeling.

Even if the gross value exceeds 5%, the moldability is good, but the upper limit of the gross value is set to 5% due to the relation with the easy peeling property of the protective tape. The particularly preferred gross value is 1.5% to 4.5%.

In the present invention, the preferred thickness of the substrate protective layer 20 is 1 μm to 10 μm, and the particularly preferred thickness is 2 μm to 5 μm.

The wax having an average particle diameter greater than the thickness of the substrate protective layer 20 is preferably because it makes possible to protrude the wax from the substrate protective layer 20, and therefore, the adhesive residue suppressing effect of the protective tape can be obtained.

Further, it is preferable to set the average particle diameter of the resin beads to be equal to the thickness of the substrate protective layer 20 because it is possible to suppress the protrusion height of the resin beads from the substrate protective layer 20 and form fine unevenness on the surface of the substrate protective layer 20 by entangling with the inorganic fine particles, which in turn can set the gross value to 1% to 5%.

The preferred materials of the layers other than the substrate protective layer 20 in the battery packaging material 1 are as follows.

[Barrier Layer]

The barrier layer 11 is responsible for providing the battery packaging material 1 with a gas barrier property for preventing oxygen/water from entering. As the barrier layer 11, it is not particularly limited, but a metal foil, such as, e.g., an aluminum foil, a SUS foil (stainless-steel foil), a copper foil, a nickel foil, a titanium foil, and a clad foil can be exemplified.

As the barrier layer 11, an aluminum foil can be suitably used. In particular, an Al—Fe based alloy foil containing 0.7 mass % to 1.7 mass % of Fe is preferred because it has excellent strength and ductility and can obtain good moldability.

The thickness of the barrier layer 11 is preferably 20 μm to 100 μm. When the thickness is 20 μm or more, it is possible to prevent the generation of pinholes at the time of rolling when producing a metal foil, and when the thickness is 100 μm or less, it is possible to reduce stress at the time of molding, such as, e.g., stretch forming and drawing, Which in turn can improve the moldability. The particularly preferred thickness of the barrier layer 11 is 30 μm to 80 μm.

Further, it is preferable that the barrier layer 11 is subjected to a substrate treatment, such as, e.g., a chemical conversion treatment, at least on a surface of the metal foil on the side of the heat-fusible resin layer 15. By being subjected to such a chemical conversion treatment, it is possible to sufficiently prevent the metal foil surface from being corroded due to the contents (such as, e.g., electrolytes of a battery).

(Substrate Layer)

As the substrate layer 13, a heat-resistant resin film that does not melt at the heat-sealing temperature at the time of heat-sealing the battery packaging material 1 is used. As the heat-resistant resin, a heat-resistant resin having a melting point higher than the melting point of the resin constituting the heat-fusible resin layer 15 by 10° C. or more, preferably by 20° C. or more, is used.

As the resin satisfying this condition, polyamide film and a polyester film such as a nylon film, and a stretched film thereof are exemplified, and the stretched film thereof is preferably used. Among these, as the substrate layer 13, it is particularly preferred to use a biaxially stretched polyamide film of a biaxially stretched nylon film etc., a biaxially stretched polybutylene terephthalate (PBT) film, a biaxially stretched polyethylene terephthalate (PET) film, or a biaxially stretched polyethylene naphthalate (PEN) film.

As the nylon film, although not particularly limited, a 6 nylon film, a 6, 6 nylon film, and an MXD nylon film can be exemplified. Note that the substrate layer 13 may be formed of a single layer, or may be formed of, for example, a multi-layer (a multi-layer formed of a PET film/a nylon film) formed of a polyester film/a polyamide film.

The thickness of the substrate layer 13 is preferably 9 μm to 50 μm, which makes it possible to secure sufficient strength as a packaging material and to reduce stresses at the time of molding, such as, e.g., stretch forming and drawing, to improve the moldability. The more preferable thickness of the substrate layer 13 is 12 μm to 30 μm.

(Heat Fusible Resin Layer)

The heat-fusible resin layer 15 imparts excellent chemical resistance against an electrolyte having high corrosiveness and also has a role of imparting a heat-sealing property to the battery packaging material 1.

The resin constituting the heat-fusible resin layer 15 is preferably a polyolefin-based resin single-layer or a multi-layer film made of, e.g., a propylene-based resin, and is preferably a non-stretched film.

As the propylene-based resin, an ethylene-propylene copolymer containing ethylene and propylene as a copolymerization component can be exemplified. The ethylene-propylene copolymer may be either a random copolymer or a block-copolymer. As a multilayer ethylene-propylene copolymer film, a three-layer film of random copolymer-block copolymer-random copolymer can be recommended. The multilayer film can be produced by coextrusion or the like.

The thickness of the heat-fusible resin layer 15 is preferably 20 μm to 100 μm, and more preferably 30 μm to 80 μm. The ratio of the thickness of each layer of the three-layer film of the above-described random copolymer-block copolymer-random copolymer is preferably 1 to 3:4 to 8:1 to 3.

The heat-fusible resin layer 15 may contain a lubricant. The type of the lubricant is similar to that added to the substrate protective layer 20, and fatty acid amides are particularly preferred. Further, the lubricant content in the heat-fusible resin layer 15 is preferably 500 ppm to 3,000 ppm. Generally, in the production process of the battery packaging material 1, all layers are laminated and then wound on a roll to be aged. The lubricant in the heat-fusible resin layer 15 is precipitated on the surface by aging and transferred to the substrate protective layer 20, which contributes to suppress the generation of glue residues of the protective tape.

(First Adhesive Layer)

The first adhesive layer 12 is exemplified by, but not particularly limited, an adhesive layer made of, e.g., a two-part curing type adhesive.

As the two-part curing type adhesive, a two-part curing type adhesive composed of a first liquid (main agent) and a second liquid (curing agent) can be exemplified, wherein the first liquid is made of one or more types of polyols selected from the group consisting of a polyurethane-based polyol, a polyester-based polyol, a polyether-based polyol, and a polyester urethane-based polyol, and the second liquid is composed of isocyanate.

Among them, it is preferable to use a two-part curing type adhesive composed of a first liquid composed of one or two or more types of polyols selected from the group consisting of a polyester-based polyol and a polyester urethane-based polyol, and two liquids (curing agent) composed of isocyanate. The preferred thickness of the first adhesive layer 12 is 2 μm to 5 μm.

(Second Adhesive Layer)

The second adhesive layer 14 is recommended to use, but not particularly limited, an adhesive containing at least one type of a polyurethane-based resin, an acryl-based resin, an epoxy-based resin, a polyolefin-based resin, an elastomer-based resin, a fluorine-based resin, and an acid-modified polypropylene resin. Among them, an adhesive made of a polyurethane composite resin having acid-modified polyolefin as a main agent is preferable. The preferred thickness of the second adhesive layer 14 is 2 μm to 5 μm.

Note that the first adhesive layer 12 and the second adhesive layer 14 are not essential layers, and the substrate layer 13 may be directly bonded to the barrier layer 11, and the heat-fusible resin layer 15 may be directly bonded to the barrier layer 11.

[Coloring Agent]

In the battery packaging material, by adding a coloring agent or newly providing a colored layer to the previously described layer, it is possible to mask the metallic color of the barrier layer and color it to a desired color, impart design to the packaging material, and make it easier to find adhesive residues of the protective tape.

In the case of coloring the pre-existing layer, a coloring agent is added to at least one of the substrate protective layer 20, the substrate layer 13, and the first adhesive layer 12.

Note that in the battery packaging material not having a first adhesive layer, a coloring agent is added to a substrate protective layer and/or a substrate layer. The coloring agent may be either a pigment or a dye, and may be one type of a coloring agent or may be a combination of two or more types of coloring agents.

As a specific coloring agent, a carbon black, calcium carbonate, titanium oxide, zinc oxide, iron oxide, aluminum powder, azo-based pigment, and phthalocyanine-based pigment can be exemplified. The coloring agent concentration in each layer is preferably 0.5 mass % or more and less than 5 mass %.

In the case of newly providing a colored layer, the colored layer is provided at least one of between the substrate protective layer 20 and the substrate layer 13, between the substrate layer 13 and the first adhesive layer 12, and between the first adhesive layer 12 and the barrier layer 11.

Note that in the battery packaging material not having a first adhesive layer, a colored layer is provided between a substrate protective layer and a substrate layer and/or between a substrate layer and a barrier layer. The thickness of the colored layer is preferably 1 μm to 10 μm. Further, the colored layer is preferably made of a colored resin composition in which the above-described coloring agent is added to a base resin made of a main agent, such as, e.g., diamine and polyol, and a curing agent. Further, the concentration of the coloring agent of the colored resin composition is preferably 5 mass % or more and 50 mass % or less.

Figure 2:
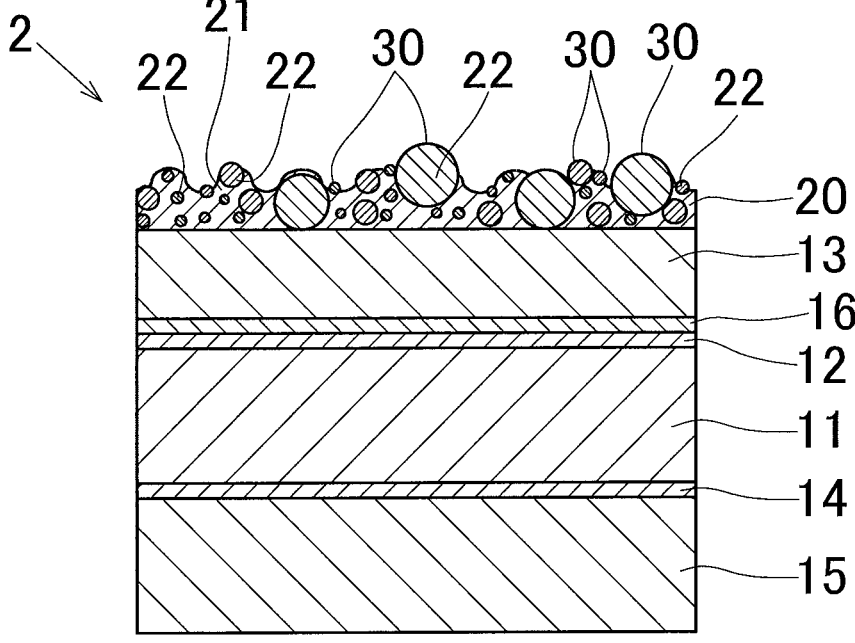
FIG. 2 is a cross-sectional view showing another example of a battery packaging material according to the present invention.

The battery packaging material 2 shown in FIG. 2 is provided with a colored layer 16 between the substrate layer 13 and the first adhesive layer 12.

EXAMPLES

Battery packaging materials 2 each having the structure shown in FIG. 2 were prepared as Examples and Comparative Examples. The materials common to each example are as follows.

(Common Material)

As the barrier layer 11, a layer was used in which a chemical conversion treatment solution composed of phosphoric acid, polyacrylic acid (acryl-based resin), chromium (III) salt compound, water, and alcohol was applied to both surfaces of an aluminum foil made of A8021-O having a thickness of 40 μm, and then dried at 180° C. to thereby form a chemical conversion coating film. The chromium adhesion amount of this chemical conversion coating film was 10 mg/m² per one side.

As the substrate layer 13, a biaxially stretched 6-nylon film having a thickness of 15 μm was used.

As the colored layer 16, a black colored layer having a thickness of 3 μm was formed on one side of the substrate layer 13 by applying a colored resin composition containing carbon black, diamine, a polyester-based polyol, and a curing agent and allowing it to stand at 40° C. for one day to proceed the crosslinking with drying. That is, the colored layer 16 and the substrate layer 13 were integrated into a two-layer film, and the two-layer film was bonded to another layer.

As the heat-fusible resin layer 15, a non-stretched polypropylene film having a thickness of 30 μm containing 3,000 ppm of erucamide as a lubricant was used.

As the first adhesive layer 12, a two-part curing type urethane-based adhesive was used.

As the second adhesive layer 14, a two-part curing type maleic acid-modified propylene adhesive was used.

As a solvent to be added to the resin composition of the substrate protective layer 20, a mixture of 50 parts by mass of methyl ethyl ketone and 50 parts by mass of toluene were used.

Example 1

A resin composition and a coating composition for forming the substrate protective layer 20 were prepared by the following method.

A polyester polyol resin was used as a main agent resin, and an adduct ("A" in Table 1) of trimethylolpropane and hexamethylene diisocyanate (HDI) was used as a curing agent, and 11 parts by mass of the curing agent was blended with 49 parts by mass of the main agent resin to prepare a binder resin.

As the solid fine particles, four types of solid fine particles, i.e., polytetrafluoroethylene wax having an average particle diameter of 12 μm, polyethylene resin beads having, an average particle diameter of 4 μm, silica having an average particle diameter of 1 μm, and barium sulfate having an average particle diameter of 2 μm, were used.

Four types of solid fine particles were blended with the binder resin at the content rate shown in Table 1 to prepare a resin composition, and 35 parts by mass of the resin composition and 100 parts by mass of the solvent were mixed to prepare a coating composition. The total content rate of the solid fine particles in the resin composition was as shown in Table 1.

Then, a first adhesive layer 12 having a thickness of 3 μm was formed on one surface of the barrier layer 11, and the surface of the colored layer 16 of the substrate layer 13 (two-layer film) with a colored layer 16 was overlaid via the first adhesive layer 12 and dry-laminated. Next, a second adhesive layer 14 having a thickness of 3 μm was formed on the other surface of the barrier layer 11, and a heat-fusible resin layer 15 was laminated via the second adhesive layer 14, sandwiched and pinched between a rubber nip roll and a laminate roll heated to 100° C. and then dry-laminated.

This resulted in a six-layer film in which the substrate layer 13, the colored layer 16, the first adhesive layer 12, the barrier layer 11, the second adhesive layer 14, and the heat-fusible resin layer 15 were laminated in order from the outside to the inside.

Next, a coating composition for the substrate protective layer 20 was applied to the surface of the six-layer laminate film substrate layer 13, dried, wound on a roll, and aged at 40° C. for 10 hours. The thickness of the substrate protective layer 20 after aging was 2.5 μm, and a seven-layer battery packaging material 2 was obtained.

Example 2

A resin composition and a coating composition for forming the substrate protective layer 20 were prepared by the following method.

The same main agent resin and curing agent as those of Example 1 were used, and 10 parts by mass of the curing agent was blended with 48 parts by mass of the main agent resin as a binder resin.

As the solid fine particles, four types of solid fine particles, i.e., polytetrafluoroethylene wax having an average particle diameter of 12 μm, polyethylene resin beads having an average particle diameter of 4 μm, silica having an average particle diameter of 1 μm, and barium sulfate having an average particle diameter of 2 μm were used.

Four types of solid fine particles were blended with the binder resin at the content rate shown in Table 1 to prepare a resin composition, and 35 parts by mass of the resin composition and 100 parts by mass of the solvent were mixed to prepare a coating composition. The total content rate of the solid fine particles in the resin composition was as shown in Table 1.

A seven-layer battery packaging material 2 was prepared in the same manner as in Example 1 except for the resin composition and the coating composition for the substrate protective layer 20. The thickness of the substrate protective layer 20 after aging was 2.5 μm.

Example 3

A resin composition and a coating composition for forming the substrate protective layer 20 were prepared by the following method.

An acrylic polyol resin was used as a main agent resin, the same curing agent as in Example 1 was used, and 9 parts by mass of the curing agent was blended with 46 parts by mass of the main agent resin was used as a binder resin.

As the solid fine particles, four types of solid fine particles, i.e., polytetrafluoroethylene wax having an average particle diameter of 14 μm, acrylic resin beads having an average particle diameter of 5 μm, alumina having an average particle diameter of 3 μm, and barium sulfate having an average particle diameter of 2 μm were used.

Four types of solid fine particles were blended with the binder resin at the content rate shown in Table 1 to prepare a resin composition, and 32 parts by mass of the resin composition and 100 parts by mass of the solvent were mixed to prepare a coating composition. The total content rate of the solid fine particles in the resin composition was as shown in Table 1.

A seven-layer battery packaging material 2 was prepared in the same manner as in Example 1 except for the resin composition and the coating composition for the substrate protective layer 20. The thickness of the substrate protective layer 20 after aging was 2 μm.

Example 4

A resin composition and a coating composition for forming the substrate protective layer 20 were prepared by the following method.

A copolymer of tetrafluoroolefin and carboxylic acid vinyl ester was used as a main agent, the same curing agent as Example 1 was used, and a mixture of 43 parts by mass of the main agent resin and 8 parts of the curing agent was used as a binder resin.

As the solid fine particles, four types of solid fine particles, i.e., polyethylene wax having an average particle diameter of 18 μm, acrylic resin beads having an average particle diameter of 6 μm, silica having an average particle diameter of 1 μm, and barium sulfate having an average particle diameter of 2 μm, were used.

Four types of solid fine particles were blended with the binder resin at the content rate shown in Table 1 to prepare a resin composition, and 28 parts by mass of the resin composition and 100 parts by mass of the solvent were mixed to prepare a coating composition. The total content rate of the solid fine particles in the resin composition was as shown in Table 1.

A seven-layer battery packaging material 2 was prepared in the same manner as in Example 1 except for the resin composition and the coating composition for the substrate protective layer 20. The thickness of the substrate protective layer 20 after aging was 1.5 μm.

Example 5

A resin composition and a coating composition for forming the substrate protective layer 20 were prepared by the following method.

The same main agent resin and curing agent as those of Example 1 were used, and 12 parts by mass of the curing agent was blended with 53 parts by mass of the main agent resin to prepare a binder resin.

As the solid fine particles, four types of solid fine particles, i.e., polyethylene wax having an average particle diameter of 10 μm, polyethylene resin beads having an average particle diameter of 3 μm, alumina having an average particle diameter of 2 μm, and calcium carbonate having an average particle diameter of 1 μm, were used.

Four types of solid fine particles were blended with the binder resin at the content rate shown in Table 1 to prepare a resin composition, and 40 parts by mass of the resin composition and 100 parts by mass of the solvent were mixed to prepare a coating composition. The total content rate of the solid fine particles in the resin composition was as shown in Table 1.

A seven-layer battery packaging material 2 was prepared in the same manner as in Example 1 except for the resin composition and the coating composition for the substrate protective layer 20. The thickness of the substrate protective layer 20 after aging was 3 μm.

Example 6

A resin composition and a coating composition for forming the substrate protective layer 20 were prepared by the following method.

The polyurethane polyol resin was used as a main agent resin, trimethylolpropane and hexamethylene diisocyanate (HDI) were blended with adduct, and trimethylolpropane was blended with 10 parts by mass of a curing agent to 46 parts by mass of a main agent resin, and adduct equivalent mixture of a binder resin and tolylene diisocyanate (TDI) (described as "B" in Table 1) was blended with trimethylolpropane.

As the solid fine particles, four types of solid fine particles, i.e., polyethylene wax having an average particle diameter of 18 μm, polyethylene resin beads having an average particle diameter of 8 μm, silica having an average particle diameter of 1 μm, and barium sulfate having an average particle diameter of 2 μm, were used.

Four types of solid fine particles were blended with the binder resin at the content rate shown in Table 1 to prepare resin composition, and 32 parts by mass of the resin composition and 100 parts by mass of the solvent were mixed to prepare a coating composition. The total content rate of the solid fine particles in the resin composition was as shown in Table 1.

A seven-layer battery packaging material 2 was prepared in the same manner as in Example 1 except for the resin composition and the coating composition for the substrate protective layer 20. The thickness of the substrate protective layer 20 after aging was 2 μm.

Comparative Example 1

A resin composition and a coating composition for forming the substrate protective layer 20 were prepared by the following method.

The same main agent resin and curing agent as those of Example 1 were used, and 12 parts by mass of the curing agent was blended with 60 parts by mass of the main agent resin to prepare a binder resin.

As solid fine particles, four types of solid fine particles, i.e., polytetrafluoroethylene wax having an average particle diameter of 8 μm, acrylic resin beads having an average particle diameter of 5 μm, silica having an average particle diameter of 1 μm, and barium sulfate having an average particle diameter of 1 μm were used.

Four types of solid fine particles were blended with the binder resin at the content rate shown in Table 1 to prepare a resin composition, and 40 parts by mass of the resin composition and 100 parts by mass of the solvent were mixed to prepare a coating composition. The total content rate of the solid fine particles in the resin composition was as shown in Table 1.

A seven-layer battery packaging material 2 was prepared in the same manner as in Example 1 except for the resin composition and the coating composition for the substrate protective layer 20. The thickness of the substrate protective layer 20 after aging was 3 μm.

Comparative Example 2

A resin composition and a coating composition for forming the substrate protective layer 20 were prepared by the following method.

The same main agent resin and curing agent as those of Example 3 were used, and 8 parts by mass of the curing agent was blended with 37 parts by mass of the main agent resin to prepare a binder resin.

As solid fine particles, four types of solid fine particles, i.e., polyethylene wax having an average particle diameter of 20 μm, polyethylene resin beads having an average particle diameter of 10 μm, alumina having an average particle diameter of 3 μm, and barium sulfate having an average particle diameter of 2 μm, were used.

Four types of solid fine particles were blended with the binder resin at the content rate shown in Table 1 to prepare a resin composition, and 40 parts by mass of the resin composition and 100 parts by mass of the solvent were mixed to prepare a coating composition. The total content rate of the solid fine particles in the resin composition was as shown in Table 1.

A seven-layer battery packaging material 2 was prepared in the same manner as in Example 1 except for the resin composition and the coating composition for the substrate protective layer 20. The thickness of the substrate protective layer 20 after aging was 3 μm.

The prepared battery packaging materials 2 were measured and evaluated for the following items. The results are shown in Table 1.

(Gross Value of Substrate Protective Layer)

Gross value of substrate protective layer 20 of the prepared battery packaging material 2 was measured at an incidence angle of 60° in accordance with JIS Z8741:1997 "Specular Gloss-Measuring Procedure" using "micro-TRI-gloss-s" manufactured by BYK Corporation as a measuring instrument.

(Discoloration of Corner of Molded Article)

The prepared battery packaging material 2 was subjected to deep drawing in a rectangular parallelepiped shape having a vertical 55 mm and a horizontal 35 mm and a depth 4.5 mm using a forming machine (part number: TP-25C-XZ) manufactured by Amada Co., Ltd.

4.5 mm molded articles using the battery packaging materials 2 of Example 1 to 6 and Comparative Examples 1 to 2 had no pinhole and no cracks, and had good moldability.

For the 4.5 mm molded articles described above, the presence or absence of discoloration of the substrate protective layer at the top corner of the molded article was visually observed and evaluated according to the following criteria.

◎: There was no discoloration of the substrate protective layer at the corner of the molded article ○: Very slight discoloration of the substrate protective layer at the corner of the molded article was observed at one to two locations Δ: Very slight discoloration of the substrate protective layer was observed at three to four locations X: A clear discoloration of the substrate protective layer was observed at the corner of the molded article Note that ◎, ○, Δ are evaluated for its use as a battery packaging material.

(Tape Adhesive Properties)

A test piece with a width 15 mm×a length 150 mm was cut out from the battery packaging material 2. An adhesive tape (tesa 70415) having a width 5 mm and a length 80 mm and having an adhesive force of 13 N/cm was adhered to the substrate protective layer 20 of the test piece along the longitudinal direction of the test piece. Then, a hand roll having a weight 2 kgf was made to travel back and forth five times on the adhesive tape, and then allowed to stand at a normal temperature for one hour.

Next, using a tensile test machine, a strograph (AGS-5kNX) manufactured by Shimadzu Corporation was used, and an end of the test piece was pinched and fixed by one of chucks, and an end portion of the adhesive tape was grasped by the other chuck. In accordance with JIS K6854-3(1999), the peel strength was measured when the tape was peeled off at 108 degrees at the peeling rate of 300 rum/min, and the value at which the measured value was stabilized was defined as the adhesive force (unit: N/mm) between the test piece and the adhesive tape.

The adhesive force between the test piece and the adhesive tape was evaluated according to the following criteria.

◎: 7 N/5 mm or more, and the adhesive property is very high

○: 5 N/5 mm or more and less than 7 N/5 mm, and adhesive properties is higher

X: Less than 5 N/5 mm, and the adhesive property is low

Note that ◎, ○ are considered as "Passed."

(Adhesive Residues)

A test piece with a width 50 mm× a length 100 mm was cut out from the battery packaging material 2. An adhesive tape (Nitto Denko V420) having a width of 40 mm and a length of 60 mm and having an adhesive strength of 0.1 N/cm was adhered to the substrate protective layer 20 of the test piece along the longitudinal direction of the test piece. Then, a hand roll having a weight 2 kgf was made to travel five times back and forth on the adhesive tape.

Then, the test piece to which the adhesive tape was adhered was heat-pressed for three hours under the condition of 80° C. and 0.5 MPa.

Then, the adhesive tape was quickly peeled off from the test piece after the series of treatments, and the peeled surface was observed and evaluated according to the following criteria.

◎: No change in the surface status as compared with the pre-adhering

○: There was a piece of adhesive that could be removed by wiping it lightly.

Δ: It could be removed by wiping, but a piece of adhesive larger than ○ remained X: Adhesive that could not be removed by wiping remained firmly.

Note that ◎, ○, and Δ considered as "Passed."

TABLE 1

| | | Substrate protective layer Resin composition | | | | | | | | | | |
|---|---|---|---|---|---|---|---|---|---|---|---|---|
| | | | | Solid fine particles | | | | | | | | |
| | | | | Wax | | | Resin beads | | | Inorganic fine particles 1 | | |
| | | Binder resin | | Average particle | Content | | Average particle | Content | | Average particle | Content | |
| | | Main resin | Curing agent | Type | diameter μm | rate mass % | Type | diameter μm | rate mass % | Type | diameter μm | rate mass % |
| Example | 1 | PEs | A | PTFE | 12 | 3 | PE | 4 | 7 | Silica | 1 | 10 |
| | 2 | PEs | A | PTFE | 12 | 5 | PE | 4 | 12 | Silica | 1 | 5 |

TABLE 1-continued

|  |  |  |  |  |  |  |  |  |  |  |  |  |
|---|---|---|---|---|---|---|---|---|---|---|---|---|
|  | 3 | AC | A | PTFE | 14 | 6 | AC | 5 | 10 | Alumina | 3 | 20 |
|  | 4 | TF | A | PE | 18 | 5 | AC | 6 | 4 | Silica | 1 | 8 |
|  | 5 | PEs | A | PE | 10 | 5 | PE | 3 | 3 | Alumina | 2 | 10 |
|  | 6 | PUR | B | PE | 18 | 5 | PE | 8 | 2 | Silica | 1 | 10 |
| Comp. | 1 | PEs | A | PTFE | 8 | 2 | AC | 5 | 3 | Silica | 1 | 7 |
| Ex. | 2 | AC | A | PE | 20 | 10 | PE | 10 | 15 | Alumina | 3 | 20 |

Substrate protective layer Resin composition
Solid fine particles

Inorganic fine particles 2

|  |  |  | Average particle diameter μm | Content rate mass % | Total content rate Mass % | Gross value | Performance evaluation | | |
|---|---|---|---|---|---|---|---|---|---|
|  |  | Type |  |  |  |  | Color change of molded article | Tape adhesive property | Adhesive residues |
| Example | 1 | Ba sulfate | 2 | 20 | 40 | 2.8 | ◎ | ◎ | ◎ |
|  | 2 | Ba sulfate | 2 | 20 | 42 | 2.3 | ◎ | ◎ | ◎ |
|  | 3 | Ba sulfate | 2 | 9 | 45 | 1.9 | ◎ | ◎ | ◎ |
|  | 4 | Ba sulfate | 2 | 31 | 48 | 1.4 | ○ | ◎ | ◎ |
|  | 5 | Ca carbonate | 1 | 15 | 33 | 4.6 | ◎ | ◎ | ○ |
|  | 6 | Ba sulfate | 2 | 33 | 50 | 1.1 | Δ | ○ | ◎ |
| Comp. | 1 | Ba sulfate | 1 | 13 | 25 | 5.6 | ◎ | ◎ | X |
| Ex. | 2 | Ba sulfate | 2 | 10 | 55 | 0.8 | X | X | ◎ |

Abbreviation for main agent resin: PEs (polyester poluyol), AC (acrylic polyol), PUR (Polyurethane polyol), TF (Copolymer of tetra-fluoroolefin and vinyl carboxylate)
Abbreviation for wax: PTFE (Polytetrafluoroethylene), PE (polyethylene)
Abbreviation for resin beads: PE (polyethylene), AC (acrylic)

From Table 1, it was confirmed that, by specifying the gross value of the solid fine particles and the surface of the substrate protective layer, the adhesive properties of the protective tape were good, and the adhesive residue at the time of peeling could be suppressed. The moldability was also good.

This application claims priority to Japanese Patent Application No. 2022-31498, filed on Mar. 2, 2022, and Japanese Patent Application No. 2023-13088, filed on Jan. 31, 2023, the disclosures of which are incorporated herein by reference in its entirety.

It should be understood that the terms and phrases used herein are for the purpose of description and not of limitation, and do not exclude any equivalents of the features shown and described herein, and are intended to allow various modifications within the scope of the present invention claim.

INDUSTRIAL APPLICABILITY

The battery packaging material according to the present invention can be suitably used as a packaging material for a power storage device, such as, e.g., a battery or a capacitor used for a mobile device exemplified by a smartphone and a tablet computer, and a battery or a condenser used for storing electric power of an electric vehicle, wind power generation, solar power generation, or storing night power.

DESCRIPTION OF REFERENCE SYMBOLS 1, 2: Battery packaging material
11: Barrier layer
12: First adhesive layer
13: Substrate layer
14: Second adhesive layer
15: Heat-fusible resin layer
16: Colored layer
20: Substrate protective layer
21: Binder resin 22: Solid fine particles
30: Protrusion

The invention claimed is:
1. A battery packaging material comprising:
a substrate layer;
a heat-fusible resin layer;
a barrier layer arranged between the substrate layer and the heat-fusible resin layer; and
a substrate protective layer as an outermost layer arranged on an outer side of the substrate layer such that the substrate layer is arranged between the substrate protective layer and the barrier layer,
wherein the substrate protective layer includes
a binder resin, and
solid fine particles including wax, resin beads and inorganic fine particles,
wherein the wax having an average particle diameter greater than a thickness of the substrate protective layer, and
wherein a gross value of a surface of the substrate protective layer is 1% to 5%.
2. The battery packaging material as recited in claim 1, wherein an average particle diameter of the wax is 5 μm to 20 μm, an average particle diameter of the resin beads is 1 μm to 10 μm, and an average particle diameter of the inorganic fine particles is 1 μm to 10 μm, and
wherein a total content rate of the wax, the resin beads, and the inorganic fine particles in the substrate protective layer is 30 mass % to 50 mass %.
3. The battery packaging material as recited in claim 1, wherein the wax is at least one type of wax selected from the group consisting of polyethylene wax, polypropylene wax, and polytetrafluoroethylene wax.
4. The battery packaging material as recited in claim 1, wherein the resin beads are at least one type of resin beads selected from the group consisting of acrylic resin beads, urethane resin beads, polyethylene resin beads, polystyrene resin beads, silicone resin beads, and fluorocarbon resin beads.

5. The battery packaging material as recited in claim 1, wherein the inorganic fine particles are at least one type of inorganic fine particles selected from the group consisting of silica, alumina, kaolin, calcium oxide, calcium carbonate, calcium sulfate, barium sulfate, and calcium silicate.

6. The battery packaging material as recited in claim 1, wherein the binder resin is at least one type of a resin selected from the group consisting of an acryl-based resin, a urethane-based resin, a polyolefin-based resin, a phenoxy-based resin, a polyester-based resin, and a tetrafluoroolefin-based resin.

7. The battery packaging material as recited in claim 1, wherein at least one of the substrate protective layer and the substrate layer contains a coloring agent.

8. The battery packaging material as recited in claim 1, wherein the barrier layer and the substrate layer are laminated via an adhesive layer, and at least one of the substrate protective layer, the substrate layer, and the adhesive layer includes a coloring agent.

9. The battery packaging material as recited in claim 1, wherein a colored layer is provided at least one of between the substrate protective layer and the substrate layer and between the substrate layer and the barrier layer.

10. The battery packaging material as recited in claim 1, wherein the barrier layer and the substrate layer are laminated via an adhesive layer, and
wherein a colored layer is provided at least one of between the substrate protective layer and the substrate layer, between the substrate layer and the adhesive layer, and between the adhesive layer and the barrier layer.

11. The battery packaging material as recited in claim 1, wherein an average particle diameter of the resin beads is equal to a thickness of the substrate protective layer.

12. The battery packaging material as recited in claim 1, wherein the inorganic fine particles include at least one of barium sulfate, silica, and alumina.

13. The battery packaging material as recited in claim 12, wherein a content rate of the barium sulfate is 9 mass % to 33 mass %.

14. The battery packaging material as recited in claim 12, wherein a content rate of the silica or the alumina is 5 mass % to 20 mass %.

15. A battery packaging material comprising:
a substrate layer;
a heat-fusible resin layer;
a barrier layer arranged between the substrate layer and the heat-fusible resin layer; and
a substrate protective layer as an outermost layer arranged on the substrate layer such that the substrate layer is arranged between the substrate protective layer and the barrier layer, the substrate protective layer comprising:
a binder resin, and
solid fine particles comprising:
wax having an average particle diameter greater than a thickness of the substrate protective layer;
resin beads; and
inorganic fine particles.

16. The battery packaging material as recited in claim 15, wherein an average particle diameter of the resin beads is equal to a thickness of the substrate protective layer.

* * * * *